US011332001B2

(12) United States Patent
Wang et al.

(10) Patent No.: US 11,332,001 B2
(45) Date of Patent: May 17, 2022

(54) DC BUS VOLTAGE REGULATION IN AUTOMOTIVE VEHICLE DURING CONTACTOR OPEN EVENTS

(71) Applicant: Ford Global Technologies, LLC, Dearborn, MI (US)

(72) Inventors: Jiyao Wang, Canton, MI (US); Wei Xu, Canton, MI (US); Silong Li, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 16/668,154

(22) Filed: Oct. 30, 2019

(65) Prior Publication Data

US 2021/0129655 A1 May 6, 2021

(51) Int. Cl.

| | |
|---|---|
| ***B60W 10/26*** | (2006.01) |
| ***B60L 3/00*** | (2019.01) |
| ***B60L 15/20*** | (2006.01) |
| ***B60K 6/445*** | (2007.10) |
| ***B60W 10/08*** | (2006.01) |
| ***B60K 6/365*** | (2007.10) |

(52) U.S. Cl.

CPC .............. *B60K 6/445* (2013.01); *B60K 6/365* (2013.01); *B60L 3/003* (2013.01); *B60L 3/0046* (2013.01); *B60L 15/20* (2013.01); *B60W 10/08* (2013.01); *B60W 10/26* (2013.01); *B60L 2210/40* (2013.01); *B60L 2240/12* (2013.01); *B60L 2240/421* (2013.01); *B60L 2240/443* (2013.01)

(58) Field of Classification Search

CPC ......... B60K 6/445; B60K 6/365; B60L 3/003; B60L 3/0046; B60L 15/20; B60L 2210/40; B60L 2240/12; B60L 2240/421; B60L 2240/443; B60W 10/08; B60W 10/26

See application file for complete search history.

(56) References Cited

U.S. PATENT DOCUMENTS

| | | | | |
|---|---|---|---|---|
| 9,834,206 | B1 | 12/2017 | Yang et al. | |
| 2014/0062349 | A1 | 3/2014 | Isayeva et al. | |
| 2014/0252849 | A1 | 9/2014 | Rao et al. | |
| 2017/0106756 | A1* | 4/2017 | Xu | H02M 3/158 |
| 2021/0097785 | A1* | 4/2021 | Zhang | G07C 5/0808 |

* cited by examiner

*Primary Examiner* — Tisha D Lewis

(74) *Attorney, Agent, or Firm* — David B. Kelley; Brooks Kushman P.C.

(57) ABSTRACT

A vehicle power system includes a battery bus between a traction battery and voltage converter, a high-voltage bus between the voltage converter and an inverter, and a controller. The controller, responsive to a contactor between the traction battery and voltage converter opening, controls an engine to maintain a speed of a generator electrically coupled with the inverter within a predefined range, controls the voltage converter to drive a measured voltage of the battery bus toward a first commanded value based on a first difference between the first commanded value and measured voltage of the battery bus, and controls the generator to drive a measured voltage of the high-voltage bus toward a second commanded value different than the first commanded value based on the first difference and a second difference between the second commanded value and the measured voltage of the high-voltage bus.

15 Claims, 2 Drawing Sheets

10
14
24
26
28
30
DC Load
Generator Inverter
Generator
Planetary Gear
Engine
Contactor
18
Batt Bus
32
34
38
VVC
Hv Bus
Motor Inverter
Traction Motor
Gear
Wheels
Battery
12
16
22
20
36
Controller(s)
40

DC BUS VOLTAGE REGULATION IN AUTOMOTIVE VEHICLE DURING CONTACTOR OPEN EVENTS

TECHNICAL FIELD

Described herein are vehicle power systems and algorithms for controlling the same.

BACKGROUND

A hybrid vehicle may have a battery and electric motor that can power the vehicle for certain distances at certain speeds, and there are different ways to combine the power from the electric motor and the internal combustion engine. Parallel hybrids, a common arrangement, connect the electric motor and the internal combustion engine to the wheels through mechanical couplings. Thus, both the electric motor and the internal combustion engine can drive the wheels directly, Series hybrids, in contrast, connect the internal combustion to the wheels through the electric motor: The internal combustion engine can drive the electric motor, and the electric motor can drive the wheels.

SUMMARY

A vehicle has a drive system including an engine, a generator, wheels, and gears mechanically coupling the engine, generator, and wheels. The vehicle also has a power system including a traction battery, a voltage converter, a battery bus between the voltage converter and traction battery, a first inverter, and a high-voltage bus between the first inverter and voltage converter. The vehicle further has a controller that, responsive to power from the traction battery becoming unavailable, controls the engine to maintain a speed of the generator within a predefined range, controls the voltage converter to drive a measured voltage of the battery bus toward a first commanded value based on a first difference between the first commanded value and measured voltage of the battery bus, and controls the generator to drive a measured voltage of the high-voltage bus toward a second commanded value different than the first commanded value based on the first difference and a second difference between the second commanded value and the measured voltage of the high-voltage bus.

A method for controlling a vehicle includes, responsive to power from a traction battery becoming unavailable, controlling an engine to maintain a speed of a generator mechanically coupled therewith within a predefined range, controlling a voltage converter to drive a measured voltage of a battery bus between the traction battery and a voltage converter toward a first commanded value based on a first difference between the first commanded value and measured voltage of the battery bus, and controlling the generator to drive a measured voltage of a high-voltage bus between the voltage converter and generator toward a second commanded value different than the first commanded value based on the first difference and a second difference between the second commanded value and the measured voltage of the high-voltage bus.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
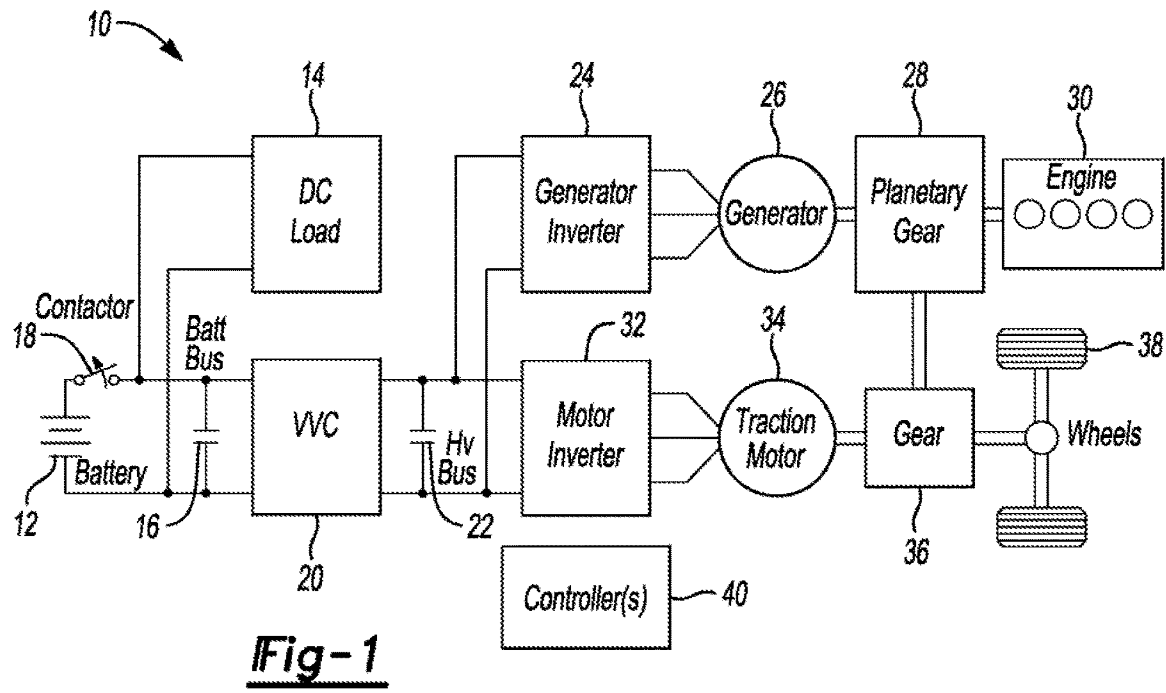
FIG. 1 is a schematic diagram of a hybrid electric vehicle.

Hybrid electric vehicles are vehicles powered by internal combustion engines and high-voltage batteries as mentioned above. FIG. 1 illustrates such a vehicle 10. The vehicle 10 includes a traction battery 12, DC loads 14, battery bus 16 (e.g., energy storage capacitor), contactor 18, variable voltage converter (VVC) 20, and high-voltage (HV) bus 22 (e.g., energy storage capacitor). The DC loads 14 and battery bus 16 are each in parallel with the traction battery 12. The contactor 18 when closed connects the traction battery 12 with the battery bus 16 such that current may flow therebetween. When open, no such current may flow. The VVC 20 can increase voltage potential from the battery bus 16 to the HV bus 22 and decrease voltage potential from the HV bus 22 to the battery bus 16 via operation of switches thereof as known to those of ordinary skill.

The vehicle 10 also includes a generator inverter 24, generator 26, planetary gears 28, and engine 30. The vehicle 10 further includes a motor inverter 32, traction motor 34, gears 36, wheels 38, and one or more controllers 40. The one or more controllers 40 may be in communication with and/or control the components of FIG. 1. The generator inverter 24 and motor inverter 32 are in parallel with the HV bus 22. Mechanical power from the engine 30 can be used to drive the generator 26 via the planetary gears 28 to generate AC electrical power. This AC power can be transformed by the generator inverter 24 to DC power by operation of the switches thereof as known to those of ordinary skill and provided to the HV bus 22. Mechanical power from the wheels 38 can also be used 10 drive the generator 26 via the gears 36 and planetary gears 28 to generate AC electrical power. DC electrical power from the HV bus 22 can be transformed by the motor inverter 32 to AC power by operation of the switches thereof as known to those of ordinary skill and provided to the traction motor 34. The traction motor 34 can convert this AC power to mechanical power to drive the wheels 35 via gears 36.

When the contactor 18 closes, it forms a closed circuit to connect the traction battery 12 and battery bus 16 in parallel, and the traction battery 12 provides a stable battery bus voltage. With this stable voltage on the battery bus 16, the VVC 20 regulates the voltage of the HV bus 22 to a desired value, such that the generator inverter 24 and motor inverter 32 operate at their desired conditions.

The battery bus 16 supplies the DC loads 14 besides the VVC 20. The DC loads 14 may include an air conditioner, brake pumps, heaters, sensors for autonomous control, vehicle controllers, smart communications, etc.

During normal conditions, the contactor 18 is closed, and the traction battery 12 is connected to the battery bus 16. At fault conditions, the contactor 18 will open and disconnect the traction battery 12 from the battery bus 16. After contactor open, without the traction battery 12 providing stable voltage, the components on the battery bus 16, including the DC loads 14, VVC 20, and HV bus 22, can no longer operate as desired. Certain existing techniques do not use the VVC during battery contactor open conditions. That is, the VVC is set to pass-through mode such that it merely acts as a passive LC low pass filter, and the motor or generator is used to regulate the HV bus or Batt bus voltage.

Because of the increasing prevalence of autonomous and smart mobility, the power consumption becomes much higher. This can affect the stability of the battery bus and HV bus. When the VVC is set to pass-through mode, the impedance between the HV bus and battery bus is quite high. This high impedance limits power capability and stability of the battery bus. Consequently, certain existing techniques will work well at low power, but may not work well at high power.

Here, we propose to maintain battery bus voltage during battery contactor open conditions. This may provide continuous and stable power supply to the battery bus and HV bus during contactor open conditions. It may also provide better transient performance, increase maximum power capability, and reduce resonant current and electrical loss in the VVC's inductor.

Embodiments may use an electrical bus network. The bus may connect multiple electrical devices to establish electrical communication. The bus network. may supply and retrieve electrical energy between the devices. Some embodiments may use a plurality of bus networks. For example, a vehicle may use a network specified for a battery in addition. to using a network specified for high voltage.

Some embodiments having a plurality of bus networks may be supplemented with a voltage converter. The voltage converter may be used to facilitate electrical communication between a plurality of bus networks. For example, a voltage converter may be used to facilitate electrical communication between a battery bus network and a high voltage bus network, wherein the battery bus network may have an optimal voltage of 12 volts and the high voltage bus network may have an optimal voltage of 100 volts. A battery connected to a battery bus network may be used to supply devices connected to the high voltage bus network. The use of a voltage converter allows power transfer from the battery to the devices, while maintaining desired voltage on both bus networks. The voltage converter may also control the voltage of the connected electrical bus networks.

Some embodiments may also use contactor switches. These contactor switches may be used to connect and disconnect electrical devices to and from the electrical bus network. For example, a contactor switch may be used to disconnect the battery from the bus. Some embodiments that use contactor switches may be actuated by electrical/magnetic signals.

Some embodiments may use a battery as an initial source of electrical potential difference. The battery may be used for propulsion of the vehicle, climate control, and other functions that may require electrical energy to operate. Other embodiments may use a plurality of batteries. The battery may be in electrical communication with a bus network.

Some embodiments may use an engine as a source of energy. The engine may be used for propulsion of the vehicle. Alternatively, the engine may be used for rotational energy by a generator.

Some embodiments may use a generator. The generator may be used to convert mechanical energy to electrical energy. Other embodiments may use a plurality of generators. The generator may be supplemented by a generator inverter. The generator may be in electrical communication with a bus network via the generator inverter. The generator inverter may modify electrical parameters produced by the generator for compatible communication with the bus network. For example, the generator may be an AC to DC rectifier. Additionally, the generator inverter may be used to receive commands regarding generator speed, force, and power.

Some embodiments may use a traction motor. The traction motor may be used to propel wheels of the vehicle. Other embodiments may use a plurality of traction motors. The traction motor may work in tandem with a motor inverter. The traction motor may be in electrical communication with a bus network via the motor inverter. The motor inverter may modify electrical parameters supplied by the bus network for compatible communication with the traction motor. For example, the motor inverter may be a DC to AC inverter.

Some embodiments may use a microcontroller. The microcontroller may be in communication with multiple electrical devices in the vehicle. The microcontroller may be in communication across multiple bus networks. The microcontroller may be used to read, store, and execute algorithms to control the electrical devices. For example, the microcontroller may be used to actuate contactors connecting electrical devices to the bus networks.

Some embodiments may use a plurality of sensors. The sensors may be used to monitor electrical parameters of the electrical devices and electrical bus networks. For example, the sensors may be used to monitor the voltage supplied by the battery. Additionally, the sensors may be used to monitor physical parameters of the electrical devices. For example, the sensors may be used to monitor the rotation speed/frequency of the generator.

Some embodiments may implement a voltage converter algorithm. This algorithm may be used in the event of a fault of an electrical device. For example, the voltage converter algorithm may be executed in the case of battery grounding or disconnection detection. Upon fault of an electrical device, the algorithm may command an associated contactor to disconnect the electrical device from the associated bus network. For example, in the event of a battery fault, the microcontroller may instruct the battery bus contactor to open. Next, the microcontroller may instruct the voltage converter to assign a predetermined protocol of electrical parameters to the electrical networks. For example, in the case of a fault, it may be optimal to provide less energy to the battery bus network, such regulating at 12 volts in normal mode being altered to regulating to 6 volts in fault mode. Alternatively, it may be optimal to completely shut off the energy provided to the battery bus network.

Regulation of the battery bus voltage may be accomplished in part by use of proportional integral (PI) controllers. A first PI controller may be provided the difference of the desired voltage and actual voltage values of a battery bus network by the sensors. The PI controller may produce a value associated with a desired inductive current of the battery bus network. A second PI controller may be provided the difference of the desired inductive current value and actual inductive current value The PI controller may produce a value associated with an inductor voltage value. A pulse wave modulator may be provided the inductor voltage value, to produce pulse width modulated (PWM) signals to the voltage converter, indicative of the desired voltage to the bus network. These signals may be in the form of a pulsed wave.

Regulation of the high voltage bus voltage may also be accomplished by use of PI controllers. A first PI controller may be provided the difference of the desired voltage and actual voltage values of a high voltage bus network by the sensors. The PI controller may produce a value associated with a desired feedback power value of the high voltage bus network. A. second PI controller may be provided the difference of the desired voltage and actual voltage values of a battery bus network by the sensors. The PI controller may produce a value associated with a desired inductive current of the battery bus network. a third difference between the first and second commanded values exceeds 50 volts An amplifier may be provided the product of the desired voltage and desired inductive current values of the battery bus network, producing an amplified desired feedforward power value of the battery bus network. A summing point may be provided the desired feedback power value of the high voltage bus network and the desired feedforward power value of the battery bus network, producing a value associated with a desired generator power.

A generator torque control module may be provided the quotient of the desired generator power value and an actual generator speed value, producing a value associated with a desired generator torque value. In alternate embodiments, the generator torque control module may be provided the product of the desired generator power value and an actual generator pace value, producing a value associated with a desired generator torque value. A pulse wave modulator may be provided the desired generator torque value to convert the value, to produce signals to the generator torque control, indicative of the desired change in torque to be produced by the generator. These signals may be in the form of a pulsed waved.

All signals generated may be further regulated by saturation clamps. For example, the amplified desired power value may be regulated to not exceed a value indication of 100 watts. Saturation regulation may act to protect electrical devices connected with the electrical bus.

Some embodiments may use an engine algorithm. This algorithm may be used in the event of a fault of an electrical device. Upon fault, the engine algorithm may instruct an associated contactor to disconnect the electrical device from the associated bus network. For example, in the event of a battery fault, the microcontroller may instruct the battery bus contactor to open.

Figure 2:
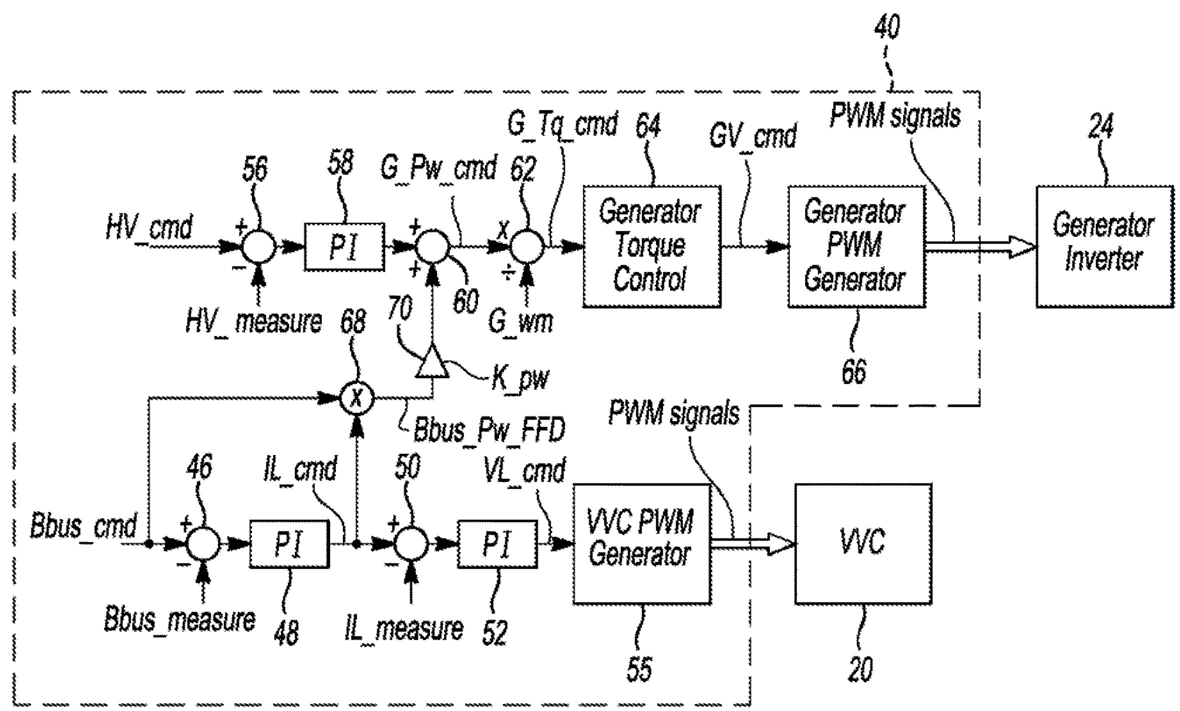
FIG. 2 is a block diagram of control algorithms for the generator inverter and variable voltage converter of FIG. 1.

FIG. 2 illustrates example control algorithms that are performed responsive to contactor open conditions. The following key describes the signals of interest.

HV_cmd—Desired value for HV bus voltage (greater than Bbus_cmd; 120%-200% of Bbus_cmd may be preferred)

HV_measure—Measured HV bus voltage (measured via a typical voltage sensor)

G_Pw_cmd—Generator power command

G_wm—Measured generator mechanical speed in rad/s (derived in known fashion from data measured via a typical rotational position sensor that measures generator rotor angle; will not encounter a zero G_wm division: if generator speed is low, the control will be disabled)

G_Tq_cmd—Generator torque command

GV_cmd—Generator voltage command

Bbus_cmd—Desired value for Batt bus voltage (e.g., 200V)

Bbus_measure—Measured Batt bus voltage (measured via a typical voltage sensor)

Bbus_Pw_FFD—Feedforward power command

K_pw—Gain of feedforward power command (gain range [0.0, 1.0])

IL_cmd—VVC inductor current command

IL_measure—Measured VVC inductor current (measured via a typical current sensor)

VL_cmd—VVC inductor voltage command

The algorithms include a difference block 46, PI controller 48, difference block 50, PI controller 52, and VVC PWM generator 54. The algorithms also include difference block 56, PI controller 58, summation block 60, quotient block 62, generator torque control 64, generator PWM generator 66, multiplication block 68, and gain block 70, Bbus_cmd and Bbus_measure are provided to the difference block 46, with the resulting difference being provided to the PI controller 48 to generate IL_cmd. IL_cmd and IL_measure are provided to the difference block 50, with the resulting difference being provided to the PI controller 52 to generate VL_cmd. VL_cmd is provided to the VVC PWM generator 55 to generate PWM signals for the VVC 20.

Bbus_cmd and IL_cmd are provided to the multiplication block 68 to generate Bbus_Pw_FFD, which is provided to the gain block 70.

HV_cmd and HV_measure are provided to the difference block 56, with the resulting difference being provided to the PI controller 58. The output therefrom and the output from the gain block 70 are provided to the summation block 60 to generate G_Pw_cmd. G_Pw_cmd and G_wm are provided to quotient block 62 to generate G_Tq_cmd, which is then provided to the generator torque control 64 to generate GV_cmd. GV_cmd is provided to the generator PWM generator 66 to generate PWM signals for the generator inverter 26.

Under normal conditions (contactor closed conditions), the commands and gains for the PI controller 48 are tuned for controlling the voltage of the HV bus 22, and the PI controller 58 is disabled (the generator 26 accepts G_Tq_cmd directly from the vehicle control). Under contactor open conditions, the command and gains for the PI controller 48 are tuned for controlling the battery bus 16. The PI controller 52, VVC PWM generator 55, generator torque control 64, and generator PWM generator 66 are well known and operate the same as under normal conditions (contactor closed conditions). Thus, each of the PI controllers 48, 52, 58 has its own Kp and Ki tuning gains, and is different from other PI blocks. Each also has its own saturation block, which clamps its output value to a reasonable minimum and maximum range based on physical limits. There are many well know algorithms to realize torque control. An example is look-up table based DQ current control, and another example is direct torque flux control. It has no difference from the torque control in normal operation. There are many well-known PWM strategies to generate three-phase PWM signals based on the inputs of three-phase voltage commands. An example is Space Vector PWM (SVPWM), and another example is discontinuous PWM (DPWM). It has no difference from the PWM generation in normal operation. The engine and motor algorithms for contactor open are well known and there is no difference from conventional algorithms. Here, however, we propose different tunings or different commands for the algorithms. In contactor open mode, the engine will execute the same control algorithm as in normal mode (contactor closed conditions), except the command of the control is to maintain generator rotational speed at a desired value to, for example, maintain speed of the generator 26 to within a desired speed range (e.g., 2000 to 9000 rpm). By comparison, at normal mode, the engine would rather operate at its own best efficiency speed.

At contactor open mode, the motor inverter 32 may initially shut down. After some delay time. When the VVC 20 and generator 26 take full control of the battery bus 16 and HV bus 22 respectively, the traction motor 23 can be re-activated. After reactivation, the motor control algorithm is the same as in normal mode, except that the traction motor 34 may operate with reduced performance, such as lower motor power capability, lower motor speed capability, and/or a longer response time.

Figure 3:
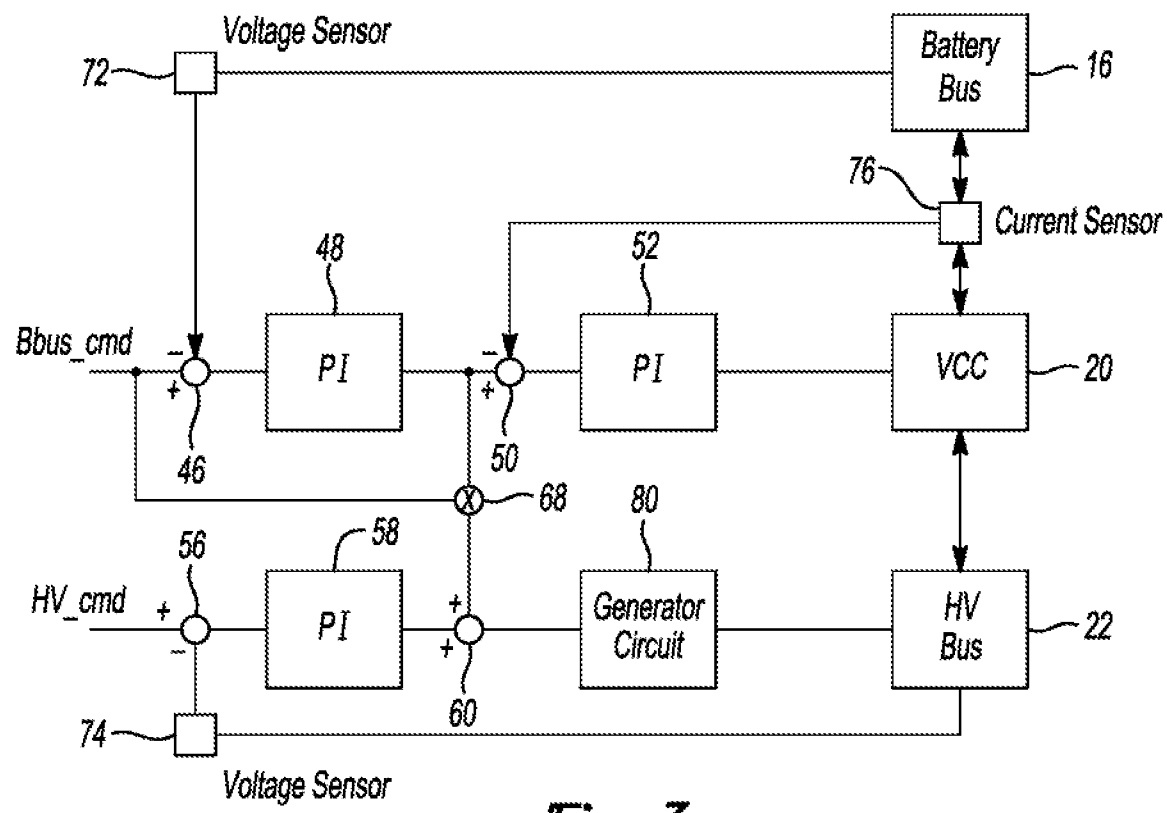
FIGS. 3 and 4 are block diagrams of portions of the control algorithms of FIG. 2.

FIG. 3 further illustrates portions of the control algorithms. In particular, FIG. 3 provides details of the feedback protocol. In addition to the components shown in FIG. 2, the control algorithms further include voltage sensor 72, voltage sensor 74, and current sensor 76. Also shown is generator circuit 80. Voltage sensor 72 actively monitors battery bus 16 and provides feedback of the voltage value to the difference block 46. Similarly, the voltage sensor 74 actively monitors the HV bus 22 and provides feedback of the voltage value of the difference block 56. The current sensor 76 actively monitors the current flow between the VCC 20 and the battery bus 16 and provides feedback of the current value to the difference block 50.

Figure 4:
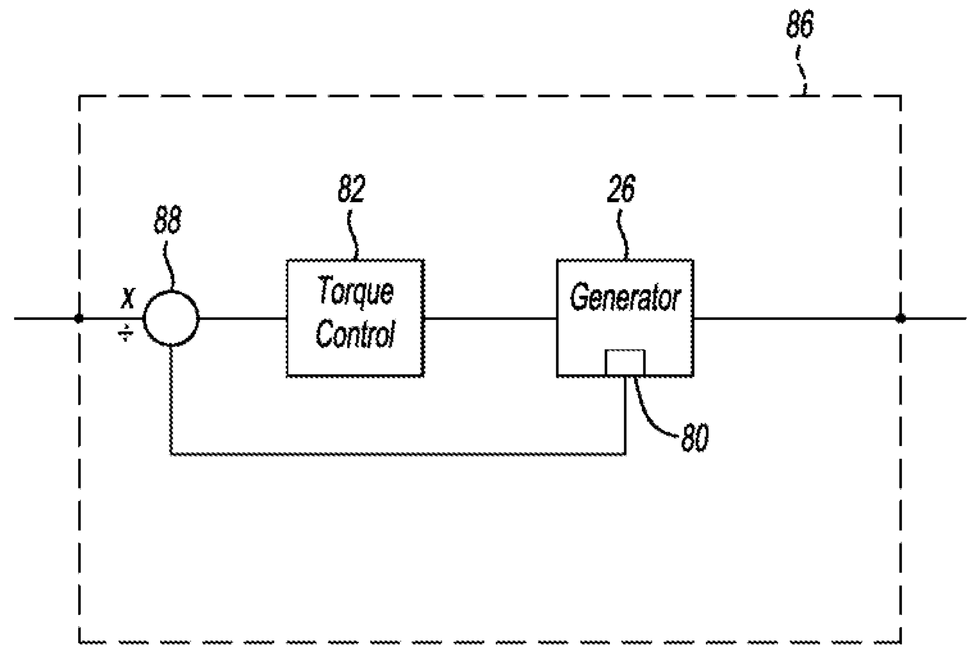

FIG. 4 illustrates the feedback protocol for the generator circuit 80. In this embodiment, the generator circuit 80 includes torque controller 82, the generator 26, rotational position sensor 86, and quotient block 88. The rotational position sensor 86 actively monitors the rotational position of the generator 26 and provides feedback to the quotient block 88 on a speed associated therewith using known techniques that derive speed information from position and time data. In addition to the speed value of the generator 26, the quotient block 88 is provided the generator power command, which the quotient block 88 divides by the speed value, producing the generator torque command value. In other embodiments, a multiplication block may be provided the rate of the generator 26 and the generator power command. The generator 26 receives the generator torque command value and responds accordingly.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:

a drive system including an engine, a generator, wheels, and gears mechanically coupling the engine, generator, and wheels;

a power system including a traction battery, a voltage converter, a battery bus between the voltage converter and traction battery, a first inverter, and a high-voltage bus between the first inverter and voltage converter; and a controller programmed to, responsive to power from the traction battery becoming unavailable, control the engine to maintain a speed of the generator within a predefined range, control the voltage converter to drive a measured voltage of the battery bus toward a first commanded value based on a first difference between the first commanded value and measured voltage of the battery bus, and control the generator to drive a measured voltage of the high-voltage bus toward a second commanded value different than the first commanded value based on the first difference and a second difference between the second commanded value and the measured voltage of the high-voltage bus.

2. The vehicle of claim 1, wherein the drive system further includes a traction motor and wherein the gears mechanically couple the traction motor and wheels.

3. The vehicle of claim 2, wherein the gears are configured such that the engine and traction motor can propel the wheels to move the vehicle.

4. The vehicle of claim 2 further comprising a second inverter between the high-voltage bus and traction motor and in parallel with the first inverter.

5. The vehicle of claim 1, wherein a third difference between the first and second commanded values exceeds 50 volts.

6. The vehicle of claim 1, wherein the predefined range is between 2000 and 9000 rpm.

7. The vehicle of claim 1, wherein the power system further includes a contactor between the traction battery and battery bus and wherein power from the traction battery becoming unavailable is defined by the contactor being open.

8. A method for controlling a vehicle comprising:

responsive to power from a traction battery becoming unavailable, controlling an engine to maintain a speed of a generator mechanically coupled therewith within a predefined range, controlling a voltage converter to drive a measured voltage of a battery bus between the traction battery and a voltage converter toward a first commanded value based on a first difference between the first commanded value and measured voltage of the battery bus, and controlling, the generator to drive a measured voltage of a high-voltage bus between the voltage converter and generator toward a second commanded value different than the first commanded value based on the first difference and a second difference between the second commanded value and the measured voltage of the high-voltage bus.

9. The method of claim 8 further comprising propelling the vehicle with power from the engine, power from a traction motor, or power from the engine and traction motor.

10. The method of claim 8, wherein a third difference between the first and second commanded values exceeds 50 volts.

11. The method of claim 8, wherein the predefined range is between 2000 and 9000 rpm.

12. The method of claim 8, wherein power from the traction battery becoming unavailable is defined by a contactor between the traction battery and voltage converter being open.

13. A vehicle power system comprising:

a battery bras between a traction battery and voltage converter;

a high-voltage bus between the voltage converter and a first inverter; and a controller programmed to, responsive to a contactor between the traction battery and voltage converter opening, control an engine to maintain a speed of a generator electrically coupled with the first inverter within a predefined range, control the voltage converter to drive a measured voltage of the battery bus toward a first commanded value based on a first difference between the first commanded value and measured voltage of the battery bus, and control the generator to drive a measured voltage of the high-voltage bus toward a second commanded value different than the first commanded value based on the first difference and a second difference between the second commanded value and the measured voltage of the high-voltage bus.

14. The vehicle power system of claim 13, wherein a third difference between the first and second commanded values exceeds 50 volts.

15. The vehicle power system of claim 13, wherein the predefined range is between 2000 and 9000 rpm.

* * * * *